UNITED STATES PATENT OFFICE.

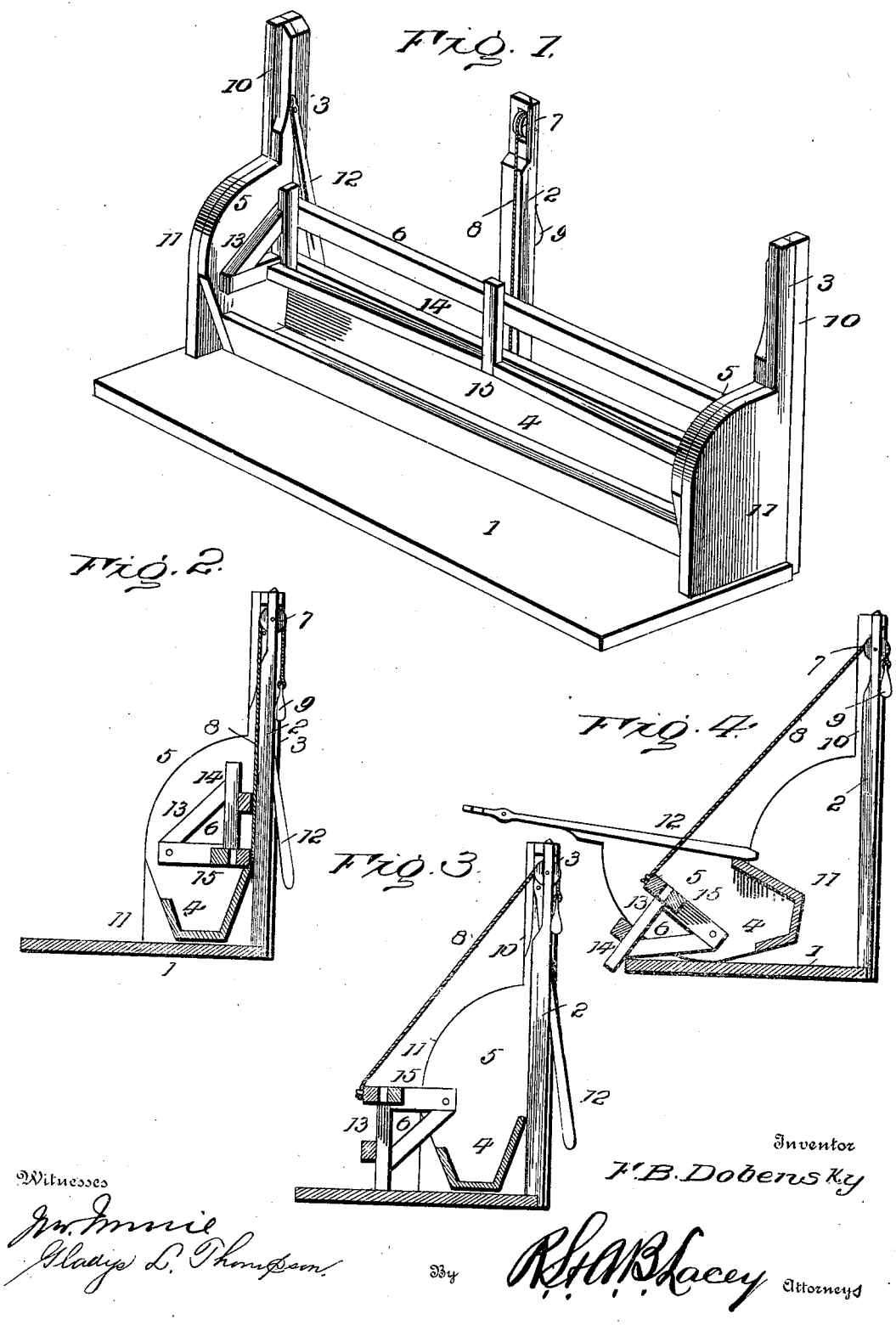

FRANCIS B. DOBENSKY, OF EMMETSBURG, IOWA.

FEED-TROUGH.

SPECIFICATION forming part of Letters Patent No. 664,241, dated December 18, 1900.

Application filed September 4, 1900. Serial No. 28,991. (No model.)

*To all whom it may concern:*

Be it known that I, FRANCIS B. DOBENSKY, a citizen of the United States, residing at Emmetsburg, in the county of Palo Alto and State of Iowa, have invented certain new and useful Improvements in Feed-Troughs; and I do hereby declare the following to be a full, clear, and exact description of the invention, such as will enable others skilled in the art to which it appertains to make and use the same.

This invention relates to troughs designed most especially for feeding swine, although adapted for stock generally.

One purpose of the invention is to enable the cleaning of the trough and the supplying of feed thereto without interference by the stock, which is held at a distance from the trough by means of a fender.

A further purpose of the invention is safety to the person when cleansing the trough or replenishing it and the provision of means which will enable these operations to be performed expeditiously, effectively, and with ease and a minimum amount of inconvenience.

For a full description of the invention and the merits thereof and also to acquire a knowledge of the details of construction of the means for effecting the result reference is to be had to the appended description and drawings hereto attached.

While the essential and characteristic features of the invention are necessarily susceptible of modification, still the preferred embodiment of the invention is illustrated in the accompanying drawings, in which—

Figure 1 is a perspective view of a feed-trough embodying the invention. Fig. 2 is a cross-section. Fig. 3 is a view similar to Fig. 2, the fender being turned. Fig. 4 is a view similar to Fig. 2, the fender and the trough being turned down.

Corresponding and like parts are referred to in the following description and indicated in all the views of the drawings by the same reference characters.

The device in its organization comprises a platform 1, a middle post 2, end uprights 3, trough 4, end pieces 5, and a counterbalanced fender 6. The platform 1 may be of any construction and size, according to the dimensions of the device, and forms a base for the parts supported thereby. The post 2 is secured at its lower end to an edge portion of the platform and is provided at its upper end with a sheave-pulley 7, over which a cord 8 or analogous flexible connection passes, said cord being secured at one end to the fender 6 and having a weight 9 attached to its opposite end and of sufficient mass to counterbalance the fender. The end uprights 3 consist of posts 10 and end-pieces 11, disposed relatively at a right angle to each other and adapted to receive the end pieces 5 of the trough in the angles formed between them. The lower portions of the end pieces 5 and 11 are widened, so as to receive between them the trough and fender.

The end pieces 5 are pivotally connected at their lower ends to the bottom portion of the end pieces 11, so as to turn from a vertical to a horizontal position, and vice versa. The trough 4 of desired formation is secured at its ends to the lower parts of the end pieces 5, so as to be closed thereby and move therewith. When the end pieces 5 occupy a vertical position, as shown in Figs. 1 and 2, the trough 4 occupies a horizontal position, and when the end pieces 5 are turned into a horizontal position, as shown in Fig. 4, the trough 4 is tilted upon one side in such a manner as to empty anything contained therein. When cleansing the trough, it occupies the position shown in Figs. 1 and 2, the water used in removing the foul matter being swished about by means of a broom or like article, and after the trough has been washed the dirty water is emptied therefrom by tilting the trough into the position substantially as shown in Fig. 4. To facilitate the turning of the trough, a lever 12 is pivotally connected to the upper end of one of the end pieces 5, and its long arm extends within convenient reach, so as to be grasped by the operator.

The fender 6 is composed of triangular-shaped end pieces 13, a wall 14, formed of slats secured to the end pieces 13, and braces 15, disposed to extend over the end portions of the trough 4 when the fender is in a normal position, as shown in Fig. 1. These braces 15 being disposed in the manner set forth strengthen the fender and prevent the stock from getting into the trough and crushing and fouling the feed contained therein. The fender has pivotal connection with the end pieces 5 and is counterbalanced by the weight 9 in the manner stated.

When the component parts of the structure are properly assembled and the device is in feeding position, it will appear substantially as shown in Fig. 1, the wall 14 being in line with the rear wall or side of the trough, so as to obstruct the passage of the stock should any attempt to pass from the inclosure by way of the trough be made. When it is required to gain access to the trough, the fender is turned so as to occupy the position shown in Fig. 3, thereby preventing any of the stock from gaining access to the trough, which can be reached by the person either for cleansing or for supplying feed thereto. To empty the contents of the trough, the latter is tilted upon its side, as shown in Fig. 4, and in this operation the fender likewise turns, so as to admit of the desired movement of the trough to insure the complete draining thereof. The advantage of the triangular form of the end pieces 13 will become apparent on reference to Fig. 4, since it admits of the fender assuming the position shown in said figure.

Having thus described the invention, what is claimed as new is—

1. In combination with a feed-trough, a fender having pivotal connection with the trough and adapted to be turned so as to extend in front thereof, substantially as specified.

2. In combination with a feed-trough, a fender comprising end pieces and a wall disposed to form an extension of a side of the trough in one position, the said fender having pivotal connection with the trough and adapted to be turned to extend in front thereof, and braces between the end pieces and the wall of the fender and adapted to extend over the trough and to act in the capacity of guards, substantially as specified.

3. In combination, a pivotally-mounted trough adapted to be tilted upon one side, and a fender having pivotal connection with the trough so as to move therewith and intermediately thereof, substantially as set forth.

4. In combination with a pivotally-mounted trough, a fender having pivotal connection with the trough and comprising end pieces of approximately triangular form, substantially as and for the purpose set forth.

5. In a stock-feeding device, a platform provided with uprights, a trough, end pieces pivotally connected to the said uprights and closing the extremities of the trough, and a fender having pivotal connection with said end pieces and adapted to be turned so as to extend in front of the trough, substantially as and for the purpose specified.

6. In a stock-feeding device, a platform provided with an intermediate and end uprights, the latter being formed of right-angularly-disposed parts, a trough, end pieces closing the extremities of the trough and pivotally connected to the end uprights, a fender pivotally attached to said end pieces and normally forming an extension of the rear side of the trough and adapted to be turned so as to extend in front of said trough, and a weighted cord attached to the fender and passing over a pulley applied to the intermediate upright, substantially as specified.

In testimony whereof I affix my signature in presence of two witnesses.

FRANCIS B. DOBENSKY. [L. S.]

Witnesses:
JAMES F. ROWE,
M. D. RILEY.